Dec. 15, 1970 J. P. MITCHELL 3,548,314
PIEZOELECTRIC PULSE AMPLIFIER
Filed Dec. 21, 1967
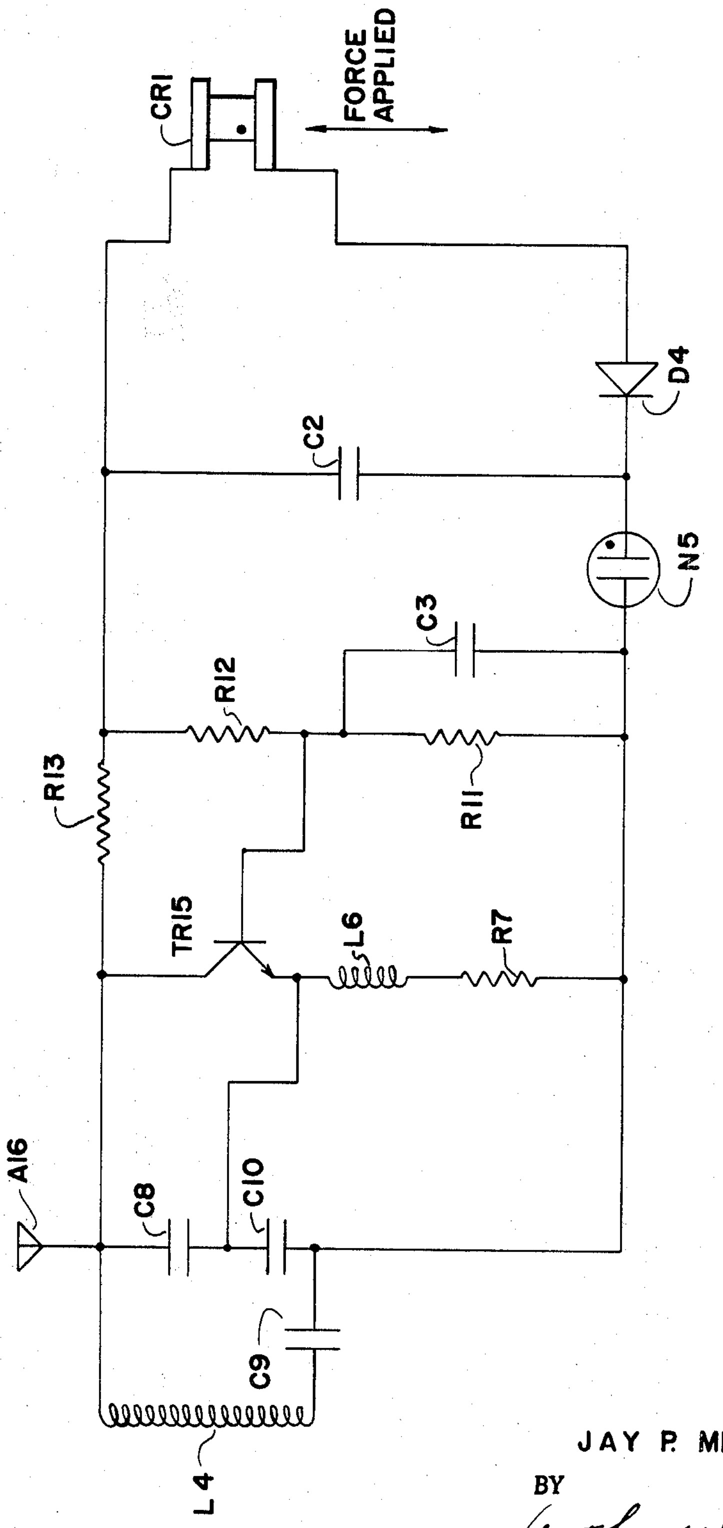
INVENTOR.
JAY P. MITCHELL
BY
ATTORNEY

United States Patent Office 3,548,314

Patented Dec. 15, 1970

3,548,314

PIEZOELECTRIC PULSE AMPLIFIER

Jay P. Mitchell, Columbus, Ohio, assignor to The Ohio State University, Columbus, Ohio, an institution of higher learning Filed Dec. 21, 1967, Ser. No. 692,534
Int. Cl. H04b 1/04
U.S. Cl. 325—185 3 Claims

ABSTRACT OF THE DISCLOSURE

This invention relates to information communication systems utilizing a circuit having a piezoelectric crystal as the sensing element. The crystal responsive to mechanical stimulation provides an electrical energy relaxation signal having a time duration directly proportional to the force of the stimulation. The signal is, in turn, utilized to modulate an oscillator circuit for signal generation of a frequency directly related to the applied force.

BACKGROUND

Materials that yield an electrical signal in response to a mechanical force and vice versa, i.e., piezoelectric, have been utilized in circuits and systems for many years. An inherent property of the piezoelectric material is that the magnitude of the derived electrical signal is directly proportional to the force applied.

There is disclosed in Patent Number 3,466,473, by Merle L. Rhoten, for "High Voltage Sonic Pulse Generator," and S.N. 637,171, by Merle L. Rhoten, filed May 9, 1967, for "High Power Continuous Wave Voltage Generator," now abandoned both assigned to The Ohio State University, method and means of deriving a high energy, i.e., voltage or alternatively current, pulse by impact of a stack of crystal assemblies. The high energy pulses taken from the stack are, in turn, utilized. In view of the nature of the pulse, however, it is most difficult to measure the voltage of current resulting from the impact; or, again, it is difficult to utilize the high energy pulses in an electronic circuit configuration.

SUMMARY OF THE INVENTION

The aforementioned electrical signal in direct response to a force impulse or dynamic variation in force is not utilized in the present invention. It has now been found that upon relaxation of the piezoelectric crystal application from an applied force a direct current signal can be detected. The signal is of a duration directly related to the impact on the crystal. To measure or utilize this "back force" signal it is permitted to charge a condenser which, in turn, is discharged through an oscillatory circuit. The condenser continues to charge and discharge for the duration of the backforce signal. As a result the oscillator circuit will go into oscillation for each condenser discharge; and, hence, the number of oscillations is directly related to the duration of the backforce signal. And, in turn, the number of oscillations is directly related to the force of the impact on the crystal.

In addition to measuring the backforce energy of the crystal, the circuit of the present invention may be used to transmit information such as a self-powered device for communication, or to generate signals from biological specimens when muscular forces might be utilized. The oscillator circuit may be utilized as a power supply to supply electrical energy to operate certain medical devices, i.e., to provide power assistance in operation of the locking mechanism in the hinge on braces used by polio patients or the operation of artificial hands.

OBJECTS

It is accordingly a principal object of the present invention to provide a new and improved electronic circuit utilizing a piezoelectric material.

It is a further object of the invention to provide an electronic oscillator circuit that is modulated in accordance with the mechanical force applied to a piezoelectric crystal.

It is another object of the invention to provide an electronic circuit response to the relaxation signal of a piezoelectric crystal.

Other objects and features of the present invention will become apparent from the detailed written description when taken in conjunction with the single figure drawing wherein:

BRIEF DESCRIPTION OF THE DRAWING

The single figure illustrates an electronic schematic circuit of an oscillator modulated by a crystal relaxation output signal.

DETAILED DESCRIPTION OF THE DRAWING

A circuit utilizing a single piezoelectric crystal to provide electrical energy to operate and modulate an oscillator circuit for signal generation is shown in the single figure drawing. With specific reference to the figure an impact force impulse or dynamic variation in force is applied to the crystal CR1. As a result of this force an impulse current will be derived. This current of a given polarity flows through the forward direction of the back-biased diode. Accordingly, this current is not utilized.

Upon relaxation of the piezoelectric crystal, after application of the force, a signal of opposite polarity having a duration directly related to the force is now detected. This current is permitted to drain through the back resistance of the diode D4. In parallel with the series crystal CR1 and diode D4 is a capacitor C2. The current passing through the diode D4 charges capacitor C2. When the charge quantity across C2 reaches a sufficient voltage the neon lamp N5 discharges. The neon lamp N5 in turn produces a current pulse that is applied to the transistor oscillator circuit. The current pulse is sufficient to cause the transistor TR15 to draw current and hence to cause the transistor oscillator circuit to go into oscillation. The resonant circuit basically comprises a transistor TR15 and an LC circuit—L4 and C8, C9, and C10. Resistors R11, R12 and R13, together with C3, form the voltage circuits necessary for operation of the transistor TR15. The output frequency of the oscillator is conventionally determined by the LC circuit. It is the period, i.e., the time, the circuit is permitted to oscillate that is conrolled through the capacitor C2, N5 and diode D4 circuit. There will be transmitted, therefore, via output circuit comprising capacitors C8, C9, and C10, and antenna circuit L14 and A16 a series of pulses of a number directly related to the backforce or relaxation signal of the crystal CR1 and of a frequency determined by the parameters of the oscillator circuit.

The amplitude of the current pulse applied to the transistor circuit from the neon lamp N5 is always constant since the neon lamp N5, oscillator circuit impedance, and the capacitor C2 create the discharge time constant. The back resistance of the diode is important. Too high or too low value of diode back resistance will not provide the characteristics required to make the circuit function. That is, too high a resistance causes the capacitor C2 to charge at a rate that will not cause oscillation in the oscillator circuit. While on the other hand, too low resistance will cause the capacitor C2 to discharge too rapidly and hence will not result in discreet pulses.

To illustrate that dynamic force changes on the crystal CR1 can be monitored by the oscillator circuit, it has been shown that a small known weight dropped from a given height causes a given number of pulses of radio frequency energy. The pulses are radiated by the oscillator and detected by a radio receiver. Variation of the drop height or a variation in the size of the weight of the object causes a proportional change in the number of radio frequency pulses to be generated. The individual pulses radiated from the oscillator circuit are alike since the neon lamp N5, the oscillator circuit impedance, and the capacitance of C2 govern the current pulse amplitude and duration.

Although a certain specific embodiment is shown, modifications may be made thereto without departing from the true spirit and scope of the invention.

What is claimed is:

1. A circuit for measuring and utilizing the force applied to a piezoelectric crystal comprising:

first circuit means biased in a first direction for rejecting the direct output signal of said crystal upon application of said force, said first circuit means bias permitting a current drain therethrough upon relaxation of said crystal from said applied force, storage means connected to said first circuit means responsive to said current, and means for utilizing the output of said storage means wherein said utilization means is an oscillator circuit normally biased to quiescence, and wherein the output of said storage means causes said circuit to overcome said bias and thereby oscillate.

2. A circuit as set forth in claim 1 wherein said storage means is a capacitor adapted to charge and discharge for a given number of cycles related to the time duration of said current passing through said first circuit means.

3. A circuit as set forth in claim 1 wherein said storage means is adapted to discharge upon attaining a predetermined level and wherein the time rate of said storage means attaining said predetermined level and discharging is the period of oscillation of said oscillator circuit.

References Cited

UNITED STATES PATENTS

| | | | |
|---|---|---|---|
| 2,856,564 | 10/1958 | Derwin | 310—8.7X |
| 3,129,346 | 4/1964 | White | 310—8 |
| 3,253,219 | 5/1966 | Littler | 310—8X |
| 3,270,283 | 8/1966 | Ikrath, et al. | 325—101 |
| 3,337,758 | 8/1967 | Brothers | 310—8.4 |
| 3,340,811 | 9/1967 | Gauld | 310—8.7X |

ROBERT L. GRIFFIN, Primary Examiner

K. W. WEINSTEIN, Assistant Examiner

U.S. Cl. X.R.

310—8.7; 325—113